Patented July 10, 1923.

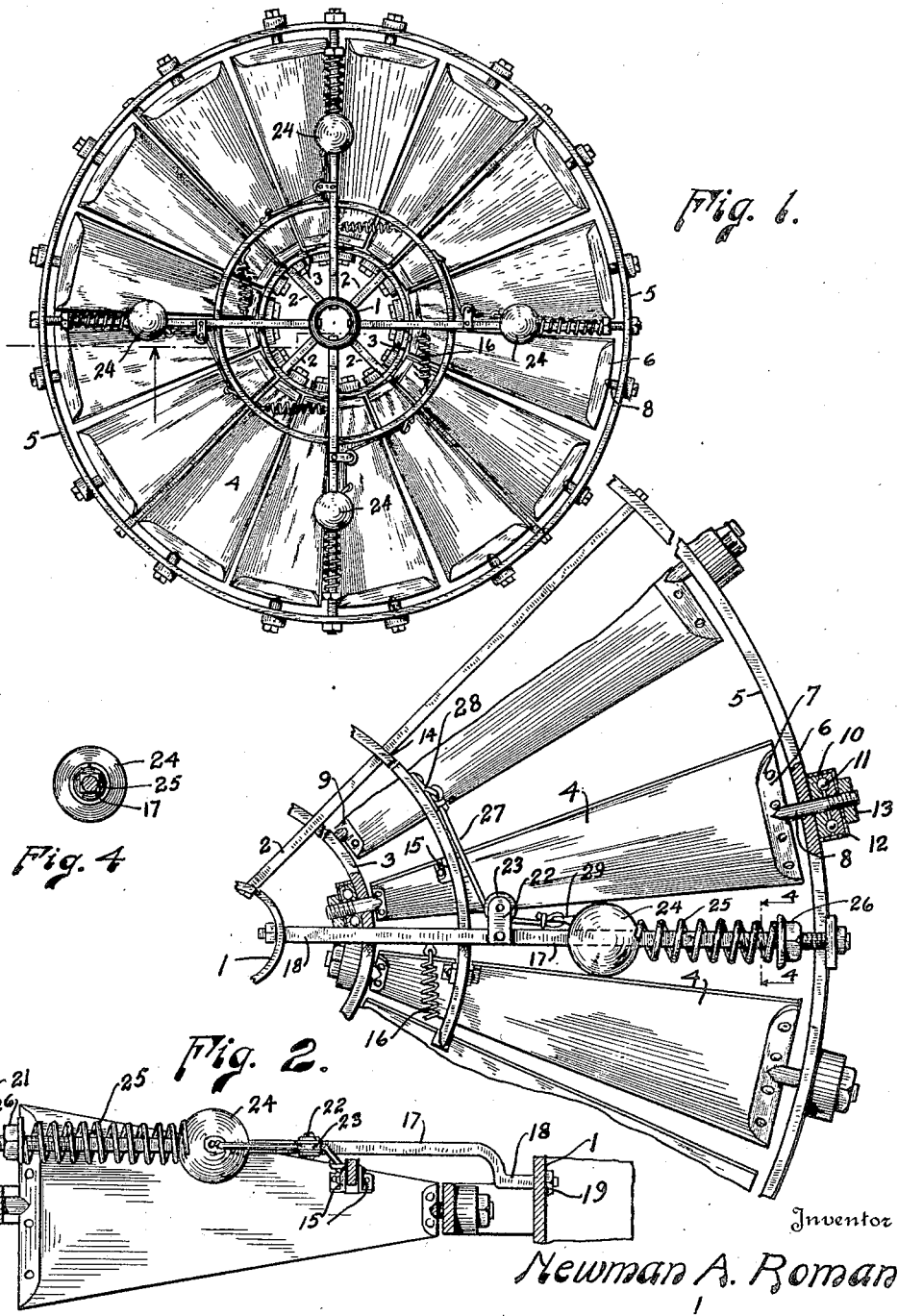

1,461,048

UNITED STATES PATENT OFFICE.

NEWMAN A. ROMAN, OF DEER TRAIL, COLORADO, ASSIGNOR OF ONE-FOURTH TO LESLIE J. McKAY AND ONE-FOURTH TO HARRY HESS, BOTH OF DEER TRAIL, COLORADO.

WINDMILL WHEEL.

Application filed April 13, 1922. Serial No. 552,174.

*To all whom it may concern:*

Be it known that I, NEWMAN A. ROMAN, a citizen of the United States of America, residing at Deer Trail, county of Arapahoe, and State of Colorado, have invented certain new and useful Improvements in Windmill Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to windmills and has reference to a windmill wheel which is provided with means whereby it will maintain substantially constant speed in air currents of different velocities.

It is well known and understood that in order to obtain practical results from a windmill in all wind velocities, within reasonable limits, it is necessary to provide the windmill with means that will automatically adjust the mill to the wind in such a manner that the speed thereof will tend to remain constant.

I am aware that many different expedients have been resorted to for the purpose of governing the speed of a windmill. I shall, however, not attempt to explain any of the means known to me, but proceed to describe my invention and in order to do so more clearly, I shall have reference to the accompanying drawing in which:

Fig. 1 shows a side elevation of my improved windmill wheel.

Fig. 2 is an elevation to an enlarged scale of a portion of the wheel and shows the manner in which the governor is attached thereto.

Fig. 3 is a section taken on line 3—3 Fig. 1, and

Fig. 4 is a section taken on line 4—4 Fig. 2.

The same reference numerals will be used to indicate the same parts throughout the several views.

Numeral 1 represents the hub of my wheel to which is secured by suitable means 2 a ring 3 in which is pivotally mounted in a manner to be hereinafter described the inner ends of sails 4. The outer ends of said sails being pivotally mounted in an outer ring 5. Secured to the outer end of each sail 4 is a malleable iron casting 6 held in place by means of rivets 7. Each casting has a bolt 8 formed integral therewith. Secured to the inner ends of sails 4 are castings 9 which are similar to castings 6. Resting against the outer surface of ring 5 is ball cup or raceway 10 and co-operating therewith is a similar ball cup 11 which has a threaded connection with bolt 8. A metal cup 12 is placed over members 10 and 11 and serves to shield the same from dirt and rain. A nut 13 serves to clamp cups 11 and 12 in place. A ball bearing similar to the one just described is provided for the inner end of sails 4 all as shown in Fig. 2.

In order to turn the sails simultaneously and to the same extent about their pivots I provide a ring 14 and to the one edge of each sail I secure two angles 15 between which the ring 14 is movably secured by means of a pin, not shown. By means of ring 14 secured to the sails 4 in the manner described I am able to rotate all of the sails by merely rotating ring 14. Springs 16 are secured at one end to ring 14 and at the other to a stationary portion of the wheel; these springs being under tension serve to hold the sails in such a position that they make their greatest angle with the axis of the wheel.

If the velocity of the wind were always constant the angle of the sails could remain constant and the speed of rotation would then always be constant for a given load, but since both the velocity of the air and the load vary it is necessary to change the angle of the sails in order to obtain a reasonably constant speed of rotation. In order to automatically govern the speed of rotation, I provide the following means.

A rectangular bar 17 has its inner end 18 secured to the hub 1 by means of a nut 19 and its outer end is fastened to ring 5 by means of a bracket 20 to the outer end of which bar 17 is clamped by means of a nut 21. Secured to bar 17 a short distance beyond the outer circumference of ring 14 are a pair of brackets 22 between which a grooved pulley 23 is rotatably mounted. A ball 24 is slidingly mounted on bar 17 beyond the brackets 23 and is held in its inward position by the action of a compression spring 25 which surrounds the bar 17 and has its inner end abutting against the ball while the outer end abuts the inner surface of the adjusting nut 26. A cable 27 has one end secured to a suitable eyelet 28 and its other end connected to an eyelet 29 on the ball 24. It will be readily apparent that when the wheel rotates the centrifugal force will cause balls 24 to move outwardly and compress spring 25. As the balls move outwardly the cable will pull the ring 14 in a clockwise direction and rotate the sails 4 about their pivots in such a manner that they will make a smaller angle with the axis of the wheel. By means of a nut 26 the tension of spring 25 can be adjusted so that the force required to compress them and move the sails a predetermined amount can be changed at will and in this manner the speed of the wheel can be adjusted. Although in the above description I have referred to one governor only I intend to use one or more pairs and have illustrated two pairs which I believe will be the maximum required.

From the above description it will appear that I have devised a windmill wheel that is of simple and substantial construction and is provided with sails that are pivotally mounted whereby the angle that they make with the direction of the air currents can be altered.

My wheel is also provided with means whereby the sails may be simultaneously adjusted and with means depending upon the speed of rotation of the wheel for automatically altering the angle of the sails so as to secure substantially constant speed in breezes of varying velocities.

Having now described my invention what I claim as new is:

A windmill wheel comprising a hub member two annular members of different diameters concentric with the hub and surrounding the same, a plurality of angularly spaced sails pivotally mounted between said annular members, a ring pivotally connected at spaced points to one edge of each sail, a spring secured to said ring and to a stationary portion of the wheel frame and adapted to normally hold the sails at a predetermined angle with respect to the plane of rotation, a pair of diametrically arranged bars, a weight slidably secured to each arm, a spring surrounding each of said bars, an adjustable abutment for the outer end of the spring, said springs being adapted to yieldingly resist the tendency of said weights to move outwardly due to centrifugal force, a pulley on said bars, a cable passing around said pulley and having one end connected to the ring and the other to the weight whereby the outward movements of the weights will rotate the ring and alter the angle of the sails in accordance with the requirements of the load and the velocity of the wind.

In testimony whereof I affix my signature.

NEWMAN A. ROMAN.